No. 726,398. PATENTED APR. 28, 1903.
C. W. BROWN.
MUD GUARD FOR WHEELED VEHICLES.
APPLICATION FILED AUG. 28, 1899.
NO MODEL. 2 SHEETS—SHEET 2.
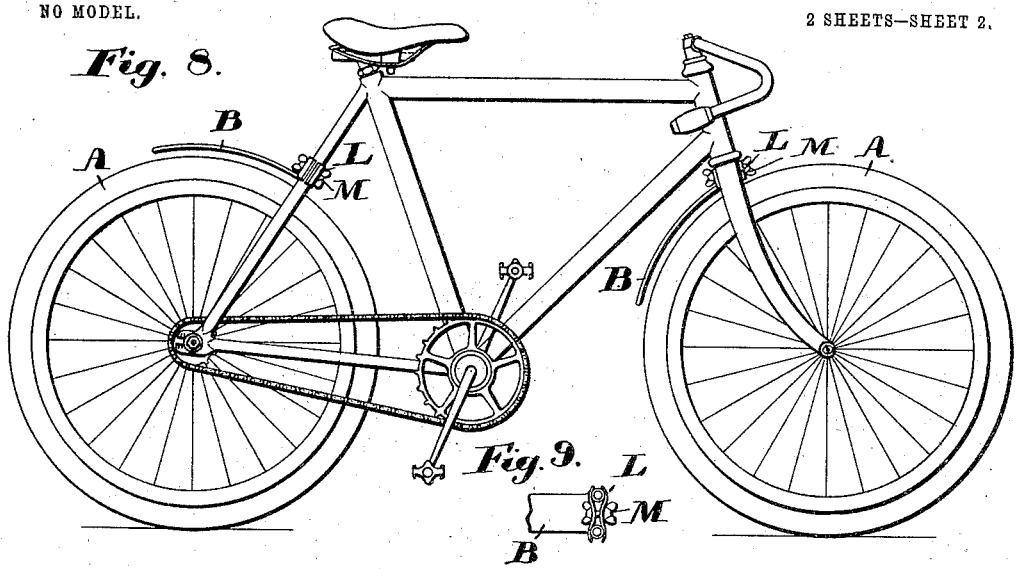
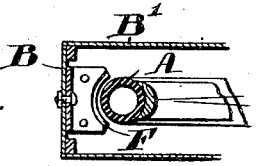
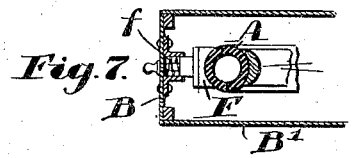
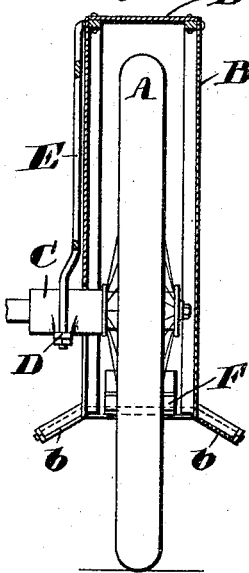
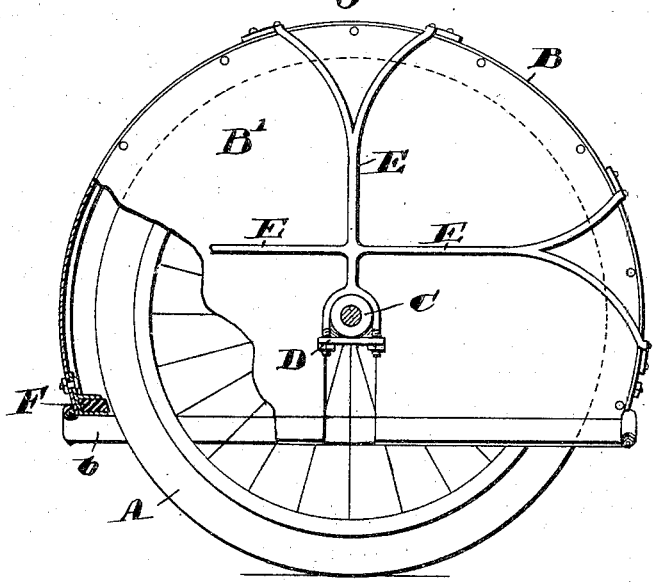
Witnesses:
Charles F. Logan
C. C. Munroe
Inventor:
Charles W. Brown
by [signature]
Atty.
THE NORRIS PETERS CO., PHOTO-LITHO., WASHINGTON, D. C.

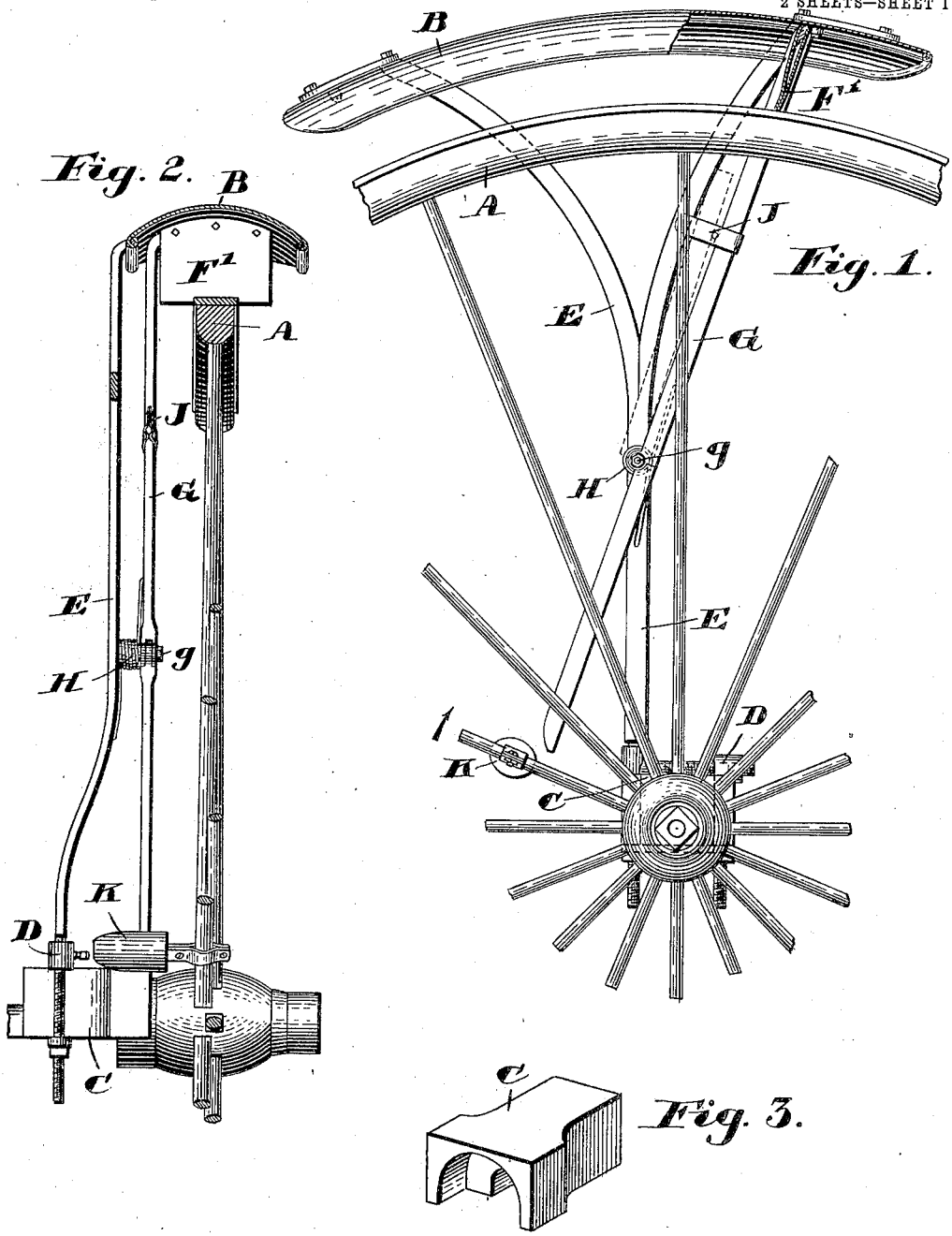

UNITED STATES PATENT OFFICE.

CHARLES W. BROWN, OF BOSTON, MASSACHUSETTS.

MUD-GUARD FOR WHEELED VEHICLES.

SPECIFICATION forming part of Letters Patent No. 726,398, dated April 28, 1903.

Application filed August 28, 1899. Serial No. 728,678. (No model.)

*To all whom it may concern:*

Be it known that I, CHARLES W. BROWN, of Boston, in the county of Suffolk and State of Massachusetts, have invented certain new and useful Improvements in Mud-Guards for Wheeled Vehicles, of which the following is a specification.

The features peculiar to my invention comprise a hub shield or cap covering the inner portion of the hub and part of the axle, forming thus a suitable support for the guard, an adjustable clamp to aid in securing the entire device removably to the vehicle by mounting it on the axle or its bearing or on said cap, an upright stem supporting the guard proper and forked at top to connect to the guard at two or more points, the guard being preferably concave both longitudinally and transversely, a mud-ejector consisting of a lever pivoted on a stud projecting from said stem and carrying at top a yielding wiper or equivalent mud-remover arranged to traverse the guard, such lever being actuated by a buffer or projection on the spoke or hub of the wheel and by a retracting spring, and being preferably jointed so that its end may be folded and held by a clasp, rendering the ejector dormant when the vehicle is backed, or when desired. For bicycles and the like the device may be simplified by omitting the vibrating ejector and by mounting the guard-sections on the frame-fork by clamp-plates, thumb-nuts, and screw-bolts. For automobiles the guard has a peripheral portion supported by arms diverging from the stem near the axle, sides inclosing the wheel laterally, and oblique wings at the lower edge of each side, a frictional wiper being provided to bear on the tubular tire with or without spring-pressure.

In the drawings, Figure 1 is an elevation of part of a carriage-wheel provided with a mud-guard embodying some of my improvements. Fig. 2 is an edge view of the same, the guard and wheel-rim in section. Fig. 3 is a perspective view of the hub shield or cap of Fig. 2. Fig. 4 is an elevation showing the inner side view, partly in section, of a wheel for automobiles furnished with my improved guard. Fig. 5 is a vertical section of such guard. Figs. 6 and 7 are horizontal sectional details of the guard and wheel-tire. Fig. 8 represents a bicycle with my modified form of guard adapted thereto. Fig. 9 is a detail of the fastening for the guard shown in Fig. 8.

In the several figures, A represents the wheel rim or tire, and B the peripheral portion of the mud-guard, covering more or less of the tire and at a suitable distance therefrom. The guard is suitably supported from the wheel bearing or axle and may be applied to the wheel and made removable from it at will, the devices varying according to the nature of the case.

In Figs. 1, 2, and 3 a hub shield or cap C is shown recessed underneath to admit the hub and fit firmly upon the axle, to which it is secured by screw-clamps D, comprising threaded arms each side of and above the cap and a follower-plate with nuts beneath it. From this clamp a stem E rises, diverging to the mud-guard B, to which it is securely attached.

In Figs. 4 and 5 the guard-supporting stem E is mounted upon the bearing C' of the rotary axle and the stem is forked, its branches being riveted to the guard B, which embraces about two-thirds of the wheel-rim. In this form the guard is furnished with sides B', of sheet metal or other thin material, secured to the edges of the peripheral part, so as to protect the wheel laterally. The lower portion $b$ of each side B' is turned obliquely outward, the ends of these portions being rolled up around a supporting-rod. (Shown in dotted lines, Fig. 5.) The inner side wall B' is cut away, as in Fig. 4, to pass over the axle and bearing and permit applying the guard to and removing it from the wheel.

In Figs. 4 to 7 a mud-ejector F is shown located within the guard B and close to the tubular tire to brush or rub off mud adhering thereto. Figs. 4, 5, and 6 show the ejector fixed in position, while in Fig. 7 it has a limited movement toward and from the tire due to the yielding action of a spring $f$, which tends to press it upon the tread-surface and remove mud at that point.

For ordinary road-carriages I have devised a vibrating mud-ejector actuated at each revolution of the wheel and having a yielding wiper or brush moving between the wheel-rim and the peripheral guard. This device is illustrated in Figs. 1 and 2.

At a point intermediate between the ends of stem E a jointed lever G is pivoted on a projecting stud g and furnished with a spiral spring H. This lever carries at its upper end a brush or wiper F', arranged to traverse the inner face of the guard B and eject mud which would otherwise accumulate. At each revolution of the carriage-wheel a buffer K, projecting outwardly from one of the spokes or from the hub, engages the lower end of lever G and swings it forward on its pivot g, thereby carrying backward the wiper F' at the upper end of the lever. The spring H returns the lever to its place. A stop at either end restricts its movement within proper limits.

In Figs. 8 and 9 the guard B is turned up endwise to fit against the fork of the frame, which extends down to a bearing on the wheel-axle. A clamping-plate L fits onto the opposite side of the fork, and the end of the guard is held to the fork by this plate and by a screw-bolt through both furnished with a thumb-nut M.

I claim as my invention—

1. In a wheeled vehicle, a mud and dirt guard comprising peripheral and side portions inclosing the upper half of the wheel, and oblique extensions of the side portions below the axle, such extension being cut away centrally on the inner side of the wheel to permit applying and removing the guard over the axle, substantially as set forth.

2. In a wheeled vehicle a mud and dirt guard covering part of the wheel-rim and supported from the axle, in combination with a movable mud-ejector actuated by the revolving wheel and a retracting spring, substantially as set forth.

3. In a wheeled vehicle, a mud and dirt guard covering part of the wheel-rim and supported on an upright arm rising from a bearing on the axle, in combination with a vibrating lever pivoted on a stud on said arm, a buffer on the wheel and a spring on said stud actuating said lever and a mud-ejector mounted at the upper end of said lever, substantially as set forth.

4. In a wheeled vehicle, a mud and dirt guard covering part of the wheel-rim and a supporting-arm therefor rising from the axle, in combination with a vibrating mud-ejector, a jointed lever pivoted on said arm and carrying said ejector, a buffer on the wheel and a spring acting on said arm and lever to actuate said ejector, and a clasp to hold the lower portion of such lever when desired out of reach of said buffer, substantially as set forth.

5. A guard for vehicle-wheels comprising a peripheral portion located adjacent to the wheel-rim, and a support secured thereto and adapted to be detachably mounted on the wheel-bearing, substantially as set forth.

In testimony whereof I have affixed my signature in presence of two witnesses.

CHARLES W. BROWN.

Witnesses:
A. H. SPENCER,
J. G. DALY.